US011243509B2

(12) United States Patent
Cai et al.

(10) Patent No.: US 11,243,509 B2
(45) Date of Patent: Feb. 8, 2022

(54) METHOD FOR ASSESSING SAFETY INTEGRITY LEVEL OF OFFSHORE OIL WELL CONTROL EQUIPMENT

(71) Applicant: China University of Petroleum (East China), Qingdao (CN)

(72) Inventors: Baoping Cai, Qingdao (CN); Yonghong Liu, Qingdao (CN); Wenchao Li, Qingdao (CN); Xiangdi Kong, Qingdao (CN); Xiaoyan Shao, Qingdao (CN); Hongqi Xu, Hebei (CN); Xincheng Li, Shandong (CN); Yandong Chen, Hebei (CN); Renjie Ji, Qingdao (CN); Zengkai Liu, Qingdao (CN); Libing Liu, Hebei (CN); Rikui Zhang, Shandong (CN); Yuqian Yang, Shandong (CN); Shitang Liu, Shandong (CN); Xin Wei, Shandong (CN)

(73) Assignee: China University of Petroleum (East China), Qingdao (CN)

( * ) Notice: Subject to any disclaimer, the term of this patent is extended or adjusted under 35 U.S.C. 154(b) by 237 days.

(21) Appl. No.: 16/704,664

(22) Filed: Dec. 5, 2019

(65) Prior Publication Data
US 2020/0371490 A1    Nov. 26, 2020

(30) Foreign Application Priority Data
May 21, 2019   (CN) ............................ 2019104217335

(51) Int. Cl.
*G05B 19/406* (2006.01)
*G06N 7/00* (2006.01)

(52) U.S. Cl.
CPC ........... *G05B 19/406* (2013.01); *G06N 7/005* (2013.01); *G05B 2219/31304* (2013.01)

(58) Field of Classification Search
USPC ........................................................ 700/282
See application file for complete search history.

(56) References Cited

U.S. PATENT DOCUMENTS 8,884,759 B2 * 11/2014 Oktem ............... G05B 23/0278
                                              340/540
2012/0317058 A1 * 12/2012 Abhulimen .......... G06N 3/0427
                                                706/2

(Continued)

OTHER PUBLICATIONS

Abimbola, Majeed, et al. "Safety and risk analysis of managed pressure drilling operation using Bayesian network." Safety science 76 (2015): 133-144. (Year: 2015).*

*Primary Examiner* — Mohammad Ali
*Assistant Examiner* — Joshua T Sanders
(74) *Attorney, Agent, or Firm* — Levine Bagade Han LLP (57) ABSTRACT

The present disclosure belongs to the field of offshore oil, and in particular relates to a method for assessing the safety integrity level of offshore oil well control equipment. The method for assessing the safety integrity level of the offshore oil well control equipment comprises three major steps: creating a safety instrumented function evaluation module and dividing the related devices for performing the safety instrumented functions into a sensor subsystem; a controller subsystem and an actuator subsystem, establishing a dynamic Bayesian network model for respective subsystems for calculation; and integrating, analyzing and optimizing the safety integrity data of the subsystems.

3 Claims, 8 Drawing Sheets

(56) References Cited

U.S. PATENT DOCUMENTS

2017/0037691 A1\* 2/2017 Savage ................... E21B 44/06
2018/0073320 A1\* 3/2018 Holmes ................ E21B 33/064

\* cited by examiner

METHOD FOR ASSESSING SAFETY INTEGRITY LEVEL OF OFFSHORE OIL WELL CONTROL EQUIPMENT

CROSS-REFERENCE TO RELATED APPLICATION

This application claims priority to Chinese patent application No. 2019104217335 filed on May 21, 2019, entitled "Method for Assessing Safety Integrity Level of Offshore Oil Well Control Equipment," which is incorporated herein by reference in its entirety.

BACKGROUND

Technical Field

The present disclosure belongs to the field of offshore oil, and in particular relates to a method for assessing the safety integrity level of an offshore oil well control equipment.

Description of the Related Art

During the exploration and development of offshore oil and gas, the well control equipment must ensure the normal implementation of safety functions under the necessary conditions, and it constitutes a generalized safety instrumented system with the well-blowout and kick parameter detection device, etc. The Safety Integrity Level (SIL) is divided according to a probability that the safety instrumented system performs safety instrumented functions at specified times and under specified conditions. The safety instrumented system is mainly used to monitor the state of the production process, judge potential risks, and promptly give an alarm or directly perform safety functions on dangerous abnormal conditions, thereby avoiding or reducing the occurrence of dangerous accidents and eliminating or decreasing the harms and impacts caused by accidents. Currently, it is widely used in petrochemical and other fields.

The quantitative calculation methods of the safety integrity level mainly include a FTA model, a RBD model, a Petri net, a Markov model, a simplified formula and so on. It is difficult to meet the requirements of accurate calculation since the FTA model, RBD model, and Petri net method lack flexibility; the model complexity of the Markov model method increases with the increase in the numbers of nodes and states of the nodes exponentially although the Markov model method is flexible and can describe different characteristics of different systems; and the simplified formula method is more direct and convenient, but it does not have universality and cannot take into account the effects of degradation law, maintenance, and so on.

BRIEF SUMMARY

In order to overcome the drawbacks above, the present disclosure provides a method for assessing the safety integrity level of an offshore oil well control equipment.

In order to achieve the object above, the following technical solutions are adopted:

The method for assessing the safety integrity level of the offshore oil well control equipment comprises three major steps: creating a safety instrumented function evaluation module and dividing the system devices into subsystems, establishing a Bayesian network model for calculation, and performing integrated calculation and optimization analysis.

The creating the safety instrumented function evaluation module and dividing the system devices into subsystems specifically comprises:

S101: according to the assessment requirement, creating the safety instrumented function modules; according to the configuration of the offshore oil well control equipment, the initially set safety instrumented functions including opening function of an upper annular blowout preventer, closing function of the upper annular blowout preventer, opening function of a lower annular blowout preventer, closing function of the lower annular blowout preventer, opening function of a drill pipe shear seal ram blowout preventer, closing function of the drill pipe shear seal ram blowout preventer, opening function of a casing shear ram blowout preventer, closing function of the casing shear ram blowout preventer, opening function of an upper ram blowout preventer, closing function of the upper ram blowout preventer, opening function of an intermediate ram blowout preventer, closing function of the intermediate ram blowout preventer, opening function of a lower ram blowout preventer, closing function of the lower ram blowout preventer, opening function of a test ram blowout preventer, closing function of the test ram blowout preventer;

S102: dividing the relevant system devices into a sensor subsystem, a controller subsystem, and an actuator subsystem; wherein the division of the sensor subsystem, the controller subsystem, and the actuator subsystem is as follows:

(1) the sensor subsystem includes device capable of detecting and predicting blowout parameters and kick parameters, and device for transmitting detected information;

(2) the controller subsystem consists of a ground control part, an underwater control module and an operator as the operating subject, wherein the ground control part consists of a main panel, a drillers panel, a toolpushers panel, and a hydraulic power system; the underwater control module consists of a blue pod underwater control module, a yellow pod underwater control module, an underwater accumulator bottle group, and an emergency battery DC power supply; and (3) the actuator subsystem includes underwater solenoid valves, hydraulic control valves, and hydraulic valves.

The establishing a Bayesian network model for calculation specially comprises:

S201: establishing a dynamic Bayesian network model for the configuration characteristics of the controller subsystem of the offshore oil well control equipment. The dynamic Bayesian network for the controller subsystem consists of N static Bayesian network models of the same structure; and the system performs the self-inspection each time after one self-inspection time interval $\Delta t$ is elapsed. The inspection test is performed on system, and the detected failure is repaired after the inspection test interval TI is elapsed; and the process of establishing the controller subsystem dynamic Bayesian network is as follows:

(1) determining the static Bayesian network model structure of the controller subsystem according to the structural configuration characteristics of the controller subsystem and the fault tree model of the controller subsystem; wherein the static Bayesian network model of the controller subsystem has four layers of nodes in total. The first layer is a failure factor node layer, the type of nodes includes single-channel independent failure node and common cause failure node, each node has five states including normal state NS, detected safe failure state SD, undetected safe failure state SU, detected dangerous failure state DD and undetected dangerous failure state DU, respectively; the second layer is a single-channel state node layer, the node represents the state of each channel in unit, and each node has five states including normal state NS, detected safe failure state SD, detected safe failure state SU, undetected dangerous failure state DD and undetected dangerous failure state DU, respectively; the third layer is a unit state node layer, the node represents the state of each unit, and each node has four states including normal state NS, safe failure state SF, detected dangerous failure state DD and undetected dangerous failure state DU, and the unit has a safe failure when the unit is in the safe failure state SF; and the fourth layer is a system state node layer, and the node represents the state of the controller subsystem and has three states including normal state NS, safe failure state SF and dangerous failure state DF, respectively;

(2) determining the conditional probability tables within a single static Bayesian network. The probability at which respective nodes of the failure factor node layer within a first static Bayesian network is in the normal state NS is 100%; the conditional probability table of the second layer nodes is determined according to the effect of failure factors on the single-channel state; the conditional probability table of the third layer nodes is determined according to the failure criterion of a redundant structure; and the conditional probability table of the fourth layer nodes is determined according to the syntagmatic relations among various units and the fault tree model;

(3) determining the transition conditional probability of the dynamic Bayesian network at self-inspection. The probability of the single-channel failure factor node of a next static Bayesian network is affected by the single-channel failure factor nodes and the unit state nodes of the previous static Bayesian network, and the probability of the common cause failure factor nodes of the next static Bayesian network is only affected by the common cause failure factor nodes of the previous static Bayesian network; and the probability of the failure factor nodes of the next static Bayesian network is determined according to the device degradation law and the self-inspection capability of the system;

(4) determining the transition conditional probability of the dynamic Bayesian network at inspection test. The probability of the failure factor nodes of the next static Bayesian network is affected by the failure factor nodes of the previous static Bayesian network; and the probability of the failure factor nodes of the next static Bayesian network is determined according to the device inspection coverage rate and repair parameters;

S202: determining failure probability parameters of each unit device in the controller subsystem; wherein the failure probability parameters are divided into a direct form and an indirect form. The failure probability parameters in a direct form include detected independent safe failure rate $\lambda_{SDN}$, undetected independent safe failure rate $\lambda_{SUN}$, detected independent dangerous failure rate $\lambda_{DDN}$, undetected independent dangerous failure rate $\lambda_{DUN}$, detected common cause safe failure rate $\lambda_{SDC}$, undetected common cause safe failure rate $\lambda_{SUC}$, detected common cause dangerous failure rate $\lambda_{DDC}$, undetected common cause dangerous failure rate $\lambda_{DUC}$; and the failure probability parameters in an indirect form include failure rate $\lambda_T$, safe failure ratio $R_S$, safe failure diagnosis coverage rate $C_S$, dangerous failure diagnosis coverage rate $C_D$, undetected common cause failure rate $\beta$ and detected common cause failure rate $\beta_D$ of respective channels in units;

S203: determining time parameters of the controller subsystem device; wherein the time parameters includes mean time to repair MTTR, mean time to system restoration MTSR, inspection test interval period TI, running time of a system TS, self-inspection time interval $\Delta t$;

S204: determining the structurally constraint type of the controller subsystem; wherein the structurally constraint type is divided into A type and B type, the A type subsystem includes instrument device with a simple structure such as switch, valve and relay, and the B type subsystem includes device with a complicated structure such as microprocessor and intelligent transducer;

S205: determining inspection test parameters of devices in the controller subsystem;

S206: performing accurate calculation by the established dynamic Bayesian network model to obtain safety integrity parameters of the controller subsystem; wherein the safety integrity parameters include a safe failure fraction SFF of the controller subsystem, an allowable maximum safety integrity level of the controller subsystem, the safety integrity level SIL of the controller subsystem, the probability of dangerous failure on demand PFD at respective time points in the controller subsystem operation, the probability of safe failure on demand PFS at respective time points in the system operation, and the average probability of dangerous failure on system demand PFDavg and the average probability of safe failure on system demand PFSavg are obtained by the following formulas:

$$PFD_{avg} = \frac{\sum_{t=1}^{N} PFD(t)}{N}$$

$$PFS_{avg} = \frac{\sum_{t=1}^{N} PFS(t)}{N}$$

S207: determining the safety integrity level ultimately by the average probability of dangerous failure on system demand PFDavg; wherein the four data of PFD, PFS, PFDavg and PFSavg calculated by the established dynamic Bayesian network model are four 1*N matrices, and the change process of safety integrity parameters of the controller subsystem can be shown through the image;

S208: optimizing the parameters affecting the safety integrity level by analyzing the safety integrity parameters of the controller subsystem; and S209: repeating steps of S201 to S208 to assess the sensor subsystem and the actuator subsystem, respectively.

The performing integrated calculation and optimization analysis specifically includes:

S301: integrating safety integrity parameters of the controller subsystem, the sensor subsystem, and the actuator subsystem to obtain the safety integrity parameters of a safety instrumented functions; wherein the average probability of dangerous failure on demand $PFD_{SYS}$ of the safety instrumented functions is calculated as follows:

$$PFD_{SYS} = PFD_S + PFD_L + PFD_{FE}$$

wherein $PFD_S$ is the average probability of dangerous failure on demand of the sensor subsystem, $PFD_L$ is the average probability of dangerous failure on demand of the controller subsystem, and $PFD_{FE}$ is the average probability of dangerous failure on demand of the actuator subsystem;

S302: obtaining the weak link of the subsystems by analyzing the safety integrity parameters and the ratio of parameters of the controller subsystem, the sensor subsystem, and the actuator subsystem, and replacing device, optimizing device configuration, adjusting device inspection time, adjusting device repair parameters for the subsystem with high safety integrity requirements; and S303: generating a safety integrity assessment report.

Compared with the prior art, the present disclosure has the beneficial effects including: a safety instrumented system for a large and complex offshore oil well control equipment is divided into a plurality of specific safety instrumented functions for performing detailed safety integrity assessment, such that the assessment process is more convenient, and the assessment result is more accurate and intuitive; the safety integrity level assessment of the safety instrumented functions is performed in strict accordance with IEC61508, IEC61511 standards; model is established using the dynamic Bayesian network method in combination with the fault tree model of the subsystem units, to quantitatively calculate safety integrity data of the subsystems, so that the safety integrity data of the subsystem are more detailed and accurate; and the quantitatively calculated data are more abundant and the results more accurate since the degradation process of each state of the device, the common cause failure effects of redundant device, the self-inspection process of the device, the external inspection process of the device, and the effects of the device repair parameters on the safety integrity assessment are fully considered during the modeling.

DESCRIPTION OF THE REFERENCE NUMBERS $PCA1^t$ independent failure of main panel in the t-th static Bayesian network
$PCA2^t$ independent failure of drillers panel in the t-th static Bayesian network
$PCA3^t$ independent failure of toolpushers panel in the t-th static Bayesian network
$PCCC^t$ common cause failure of panel in the t-th static Bayesian network
$PCB1^t$ state of main panel in the t-th static Bayesian network
$PCB2^t$ state of drillers panel in the t-th static Bayesian network
$PCB3^t$ state of toolpushers panel in the t-th static Bayesian network
$PC^t$ state of panel unit in the t-th static Bayesian network
$ESA1^t$ independent failure of Ethernet switch 1 in the t-th static Bayesian network
$ESA2^t$ independent failure of Ethernet switch 2 in the t-th static Bayesian network
$ESCC^t$ common cause failure of Ethernet switch in the t-th static Bayesian network
$ESB1^t$ state of Ethernet switch 1 in the t-th static Bayesian network
$ESB2^t$ state of Ethernet switch 2 in the t-th static Bayesian network
$ES^t$ state of Ethernet switch unit in the t-th static Bayesian network
$PLCA1^t$ independent failure of platform PLC1 in the t-th static Bayesian network
$PLCA2^t$ independent failure of platform PLC2 in the t-th static Bayesian network
$PLCA3^t$ independent failure of platform PLC3 in the t-th static Bayesian network
$PLCCC^t$ common cause failure of platform PLC in the t-th static Bayesian network
$PLCB1^t$ state of platform PLC1 in the t-th static Bayesian network
$PLCB2^t$ state of platform PLC2 in the t-th static Bayesian network
$PLCB3^t$ state of platform PLC3 in the t-th static Bayesian network
$PLC^t$ state of platform PLC in the t-th static Bayesian network
$PODA1^t$ independent failure of underwater control blue pod in the t-th static Bayesian network
$PODA2^t$ independent failure of underwater control yellow pod in the t-th static Bayesian network
$PODCC^t$ common cause failure of underwater control pod in the t-th static Bayesian network
$PODB1^t$ state of underwater control blue pod in the t-th static Bayesian network
$PODB2^t$ state of underwater control yellow pod in the t-th static Bayesian network
$POD^t$ state of underwater control pod unit in the t-th static Bayesian network
$C^t$ state of control system in the t-th static Bayesian network
$PCA1^{t+1}$ independent failure of main panel in the (t+1)-th static Bayesian network
$PCA2^{t+1}$ independent failure of drillers panel in the (t+1)-th static Bayesian network
$PCA3^{t+1}$ independent failure of toolpushers panel in the (t+1)-th static Bayesian network
$PCCC^{t+1}$ common cause failure of panel in the (t+1)-th static Bayesian network
$ESA1^{t+1}$ independent failure of Ethernet switch 1 in the (t+1)-th static Bayesian network
$ESA2^{t+1}$ independent failure of Ethernet switch 2 in the (t+1)-th static Bayesian network
$ESCC^{t+1}$ common cause failure of Ethernet switch in the (t+1)-th static Bayesian network
$PLCA1^{t+1}$ independent failure of platform PLC1 in the (t+1)-th static Bayesian network PLCA2$^{t+1}$ independent failure of platform PLC2 in the (t+1)-th static Bayesian network PLCA3$^{t+1}$ independent failure of platform PLC3 in the (t+1)-th static Bayesian network PLCCC$^{t+1}$ common cause failure of platform PLC in the (t+1)-th static Bayesian network PODA1$^{t+1}$ independent failure of underwater control blue pod in the (t+1)-th static Bayesian network PODA2$^{t+1}$ independent failure of underwater control yellow pod in the (t+1)-th static Bayesian network PODCC$^{t+1}$ common cause failure of underwater control pod in the (t+1)-th static Bayesian network

DETAILED DESCRIPTION

Figure 1A:
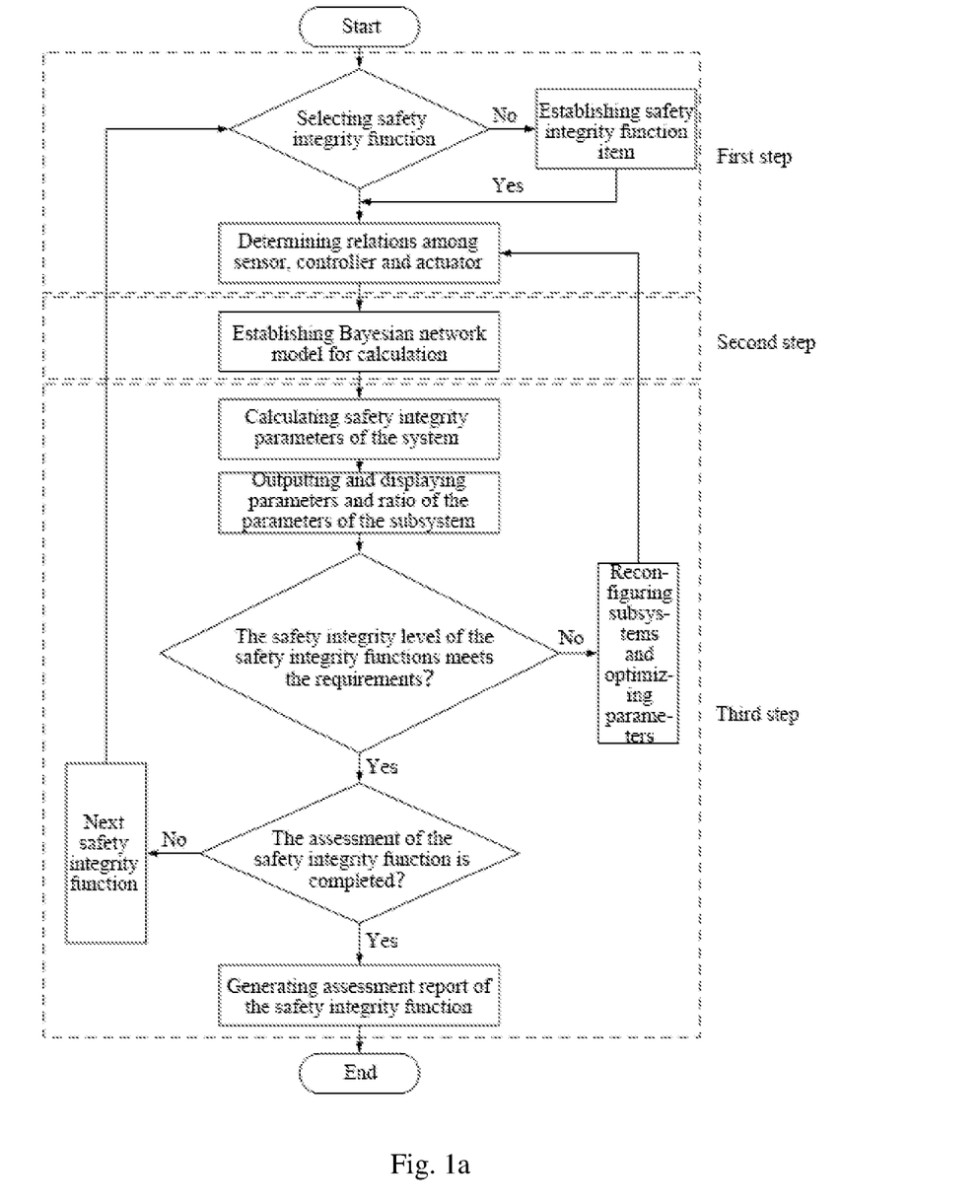
FIG. 1a is a schematic diagram showing a method process for assessing the safety integrity level of offshore oil well control equipment.

As shown in FIG. 1a, a method for assessing the safety integrity level of an offshore oil well control equipment comprises three major steps: creating a safety instrumented function evaluation module and dividing system devices into subsystems, establishing a Bayesian network model for calculation, and performing integrated calculation and optimization analysis.

Figure 2:
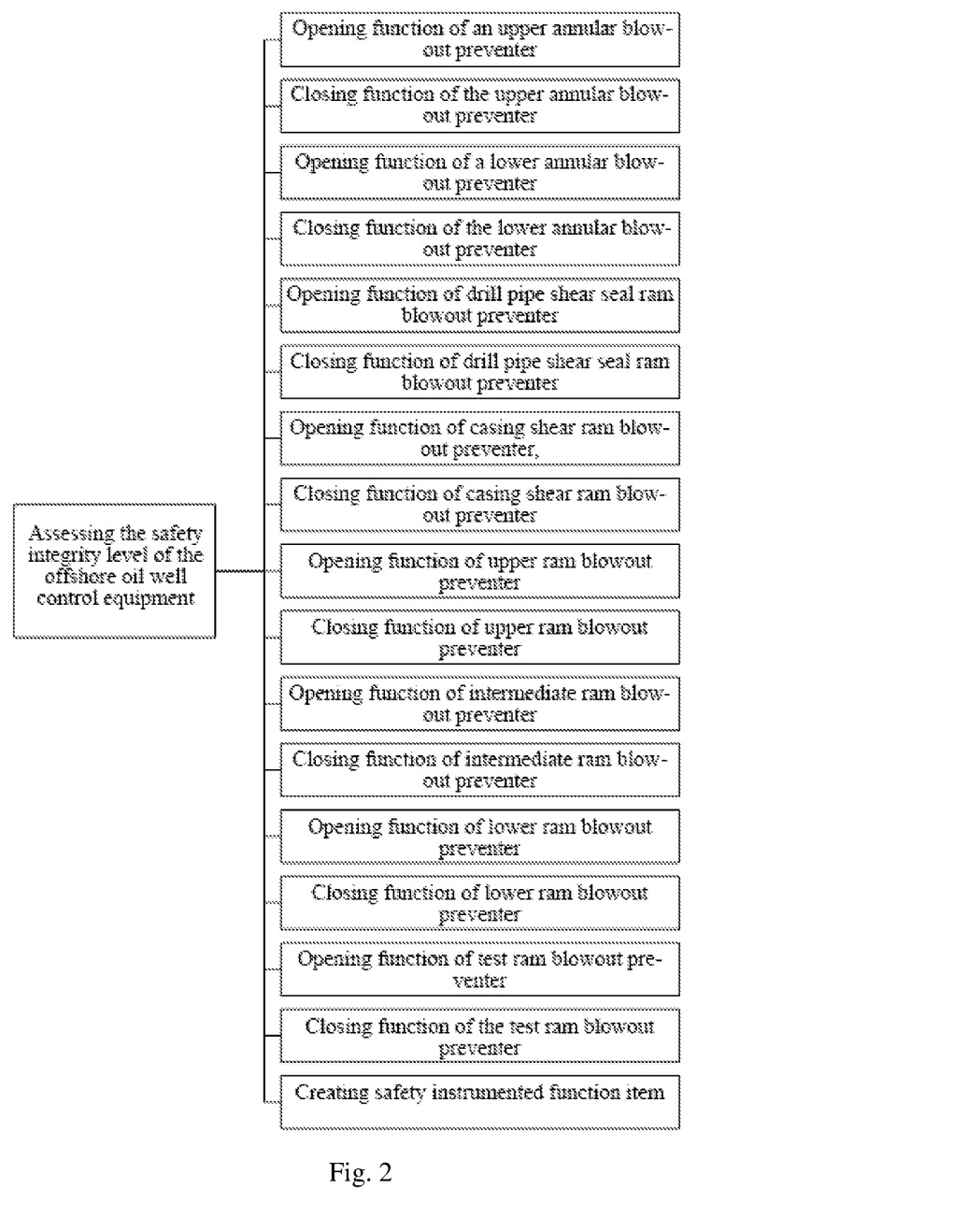
FIG. 2 is a schematic diagram showing safety instrumented functions of the offshore oil well control equipment.
Figure 3:
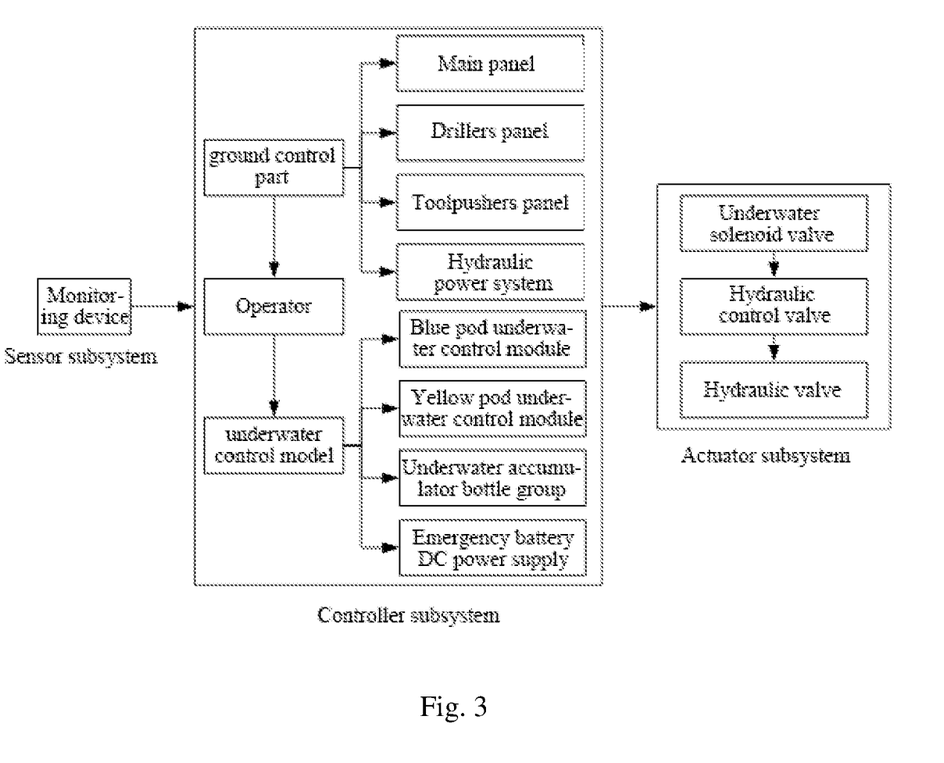
FIG. 3 is a schematic diagram showing basic components of a sensor, a controller, and an actuator subsystem device.

The creating the safety instrumented function evaluation modules and dividing the system devices into subsystems specifically comprises:

S101: according to the assessment requirement, creating the safety instrumented function modules; as shown in FIG. 2, according to the configuration of the offshore oil well control equipment, the initially set safety instrumented functions including opening function of an upper annular blowout preventer, closing function of the upper annular blowout preventer, opening function of a lower annular blowout preventer, closing function of the lower annular blowout preventer, opening function of a drill pipe shear seal ram blowout preventer, closing function of the drill pipe shear seal ram blowout preventer, opening function of a casing shear ram blowout preventer, closing function of the casing shear ram blowout preventer, opening function of an upper ram blowout preventer, closing function of the upper ram blowout preventer, opening function of an intermediate ram blowout preventer, closing function of the intermediate ram blowout preventer, opening function of a lower ram blowout preventer, closing function of the lower ram blowout preventer, opening function of a test ram blowout preventer, and closing function of the test ram blowout preventer;

S102: dividing the relevant system devices into a sensor subsystem, a controller subsystem, and an actuator subsystem; wherein the sensor subsystem, the controller subsystem, and the actuator subsystem have the basic components as shown in FIG. 3, and the division of the sensor subsystem, the controller subsystem, and the actuator subsystem is as follows:

(1) the sensor subsystem includes device capable of detecting and predicting blowout parameters and kick parameters, and device for transmitting detected information;

(2) the controller subsystem consists of a ground control part, an underwater control module and an operator as the operating subject, wherein the ground control part consists of a main panel, a drillers panel, a toolpushers panel, and a hydraulic power system; the underwater control module consists of a blue pod underwater control module, a yellow pod underwater control module, an underwater accumulator bottle group, and an emergency battery DC power supply; and (3) the actuator subsystem includes an underwater solenoid valve, a hydraulic control valve, and a hydraulic valve.

Figure 1B:
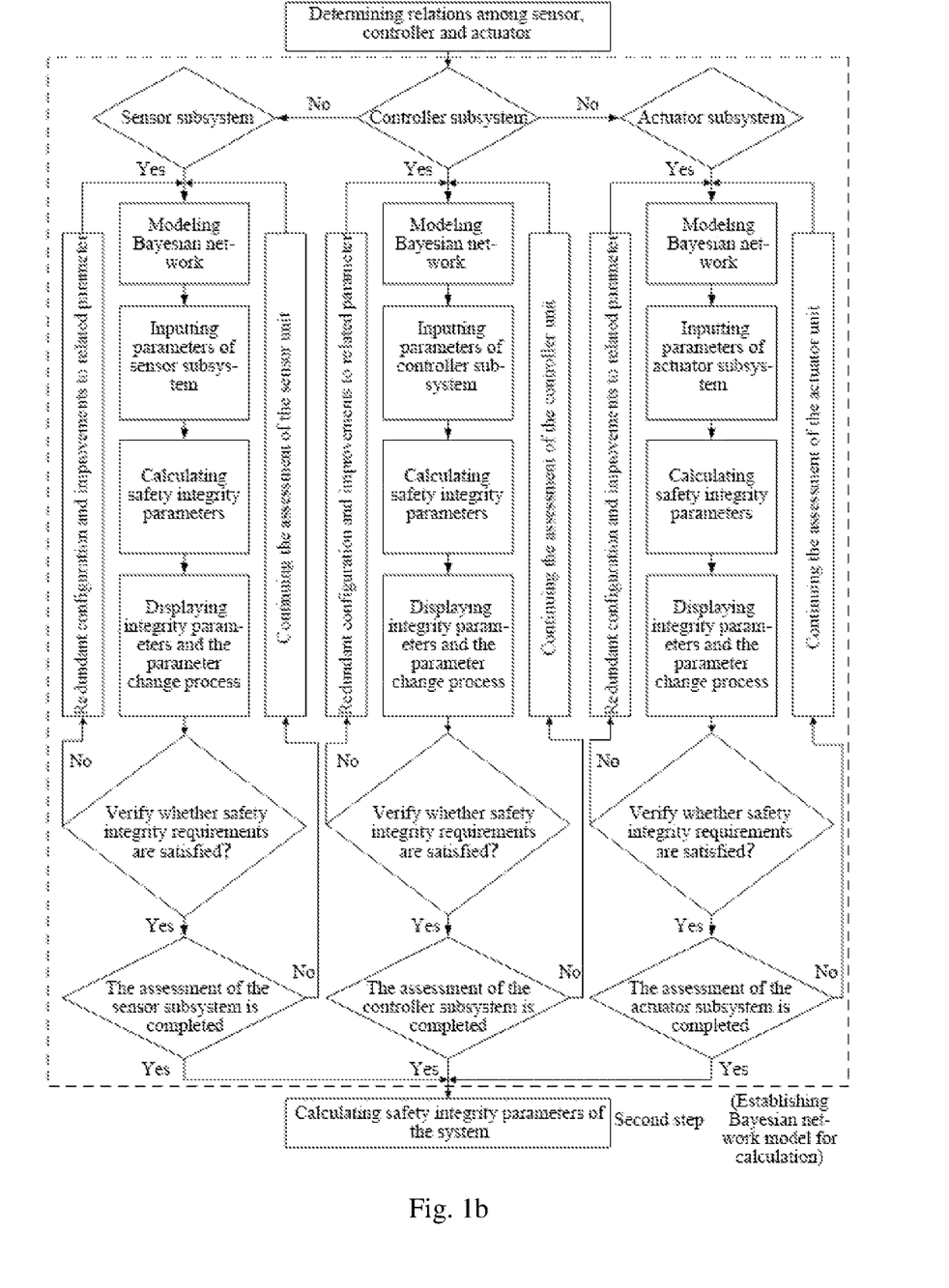
FIG. 1b is a schematic diagram showing establishing a Bayesian network model to calculate in the process method for assessing the safety integrity level of offshore oil well control equipment.
Figure 4:
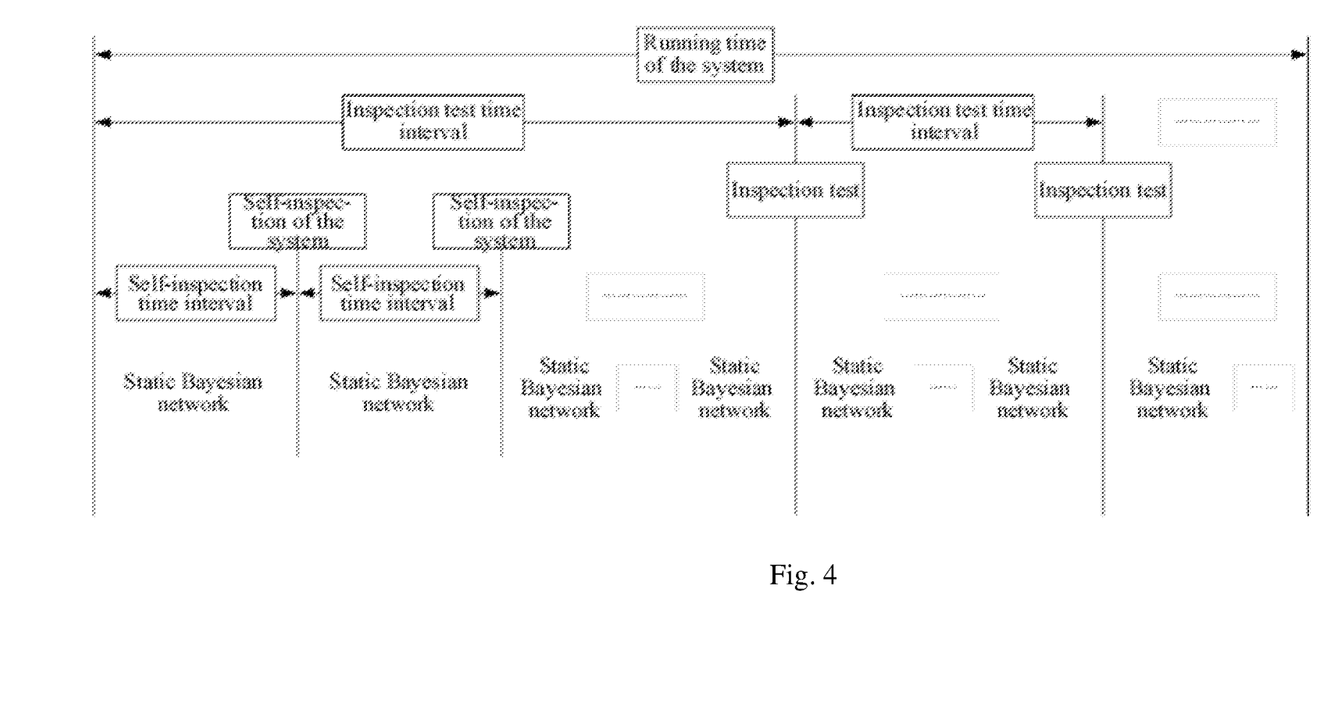
FIG. 4 is a schematic diagram showing a dynamic Bayesian network model of a control system of the offshore oil well control equipment.
Figure 5:
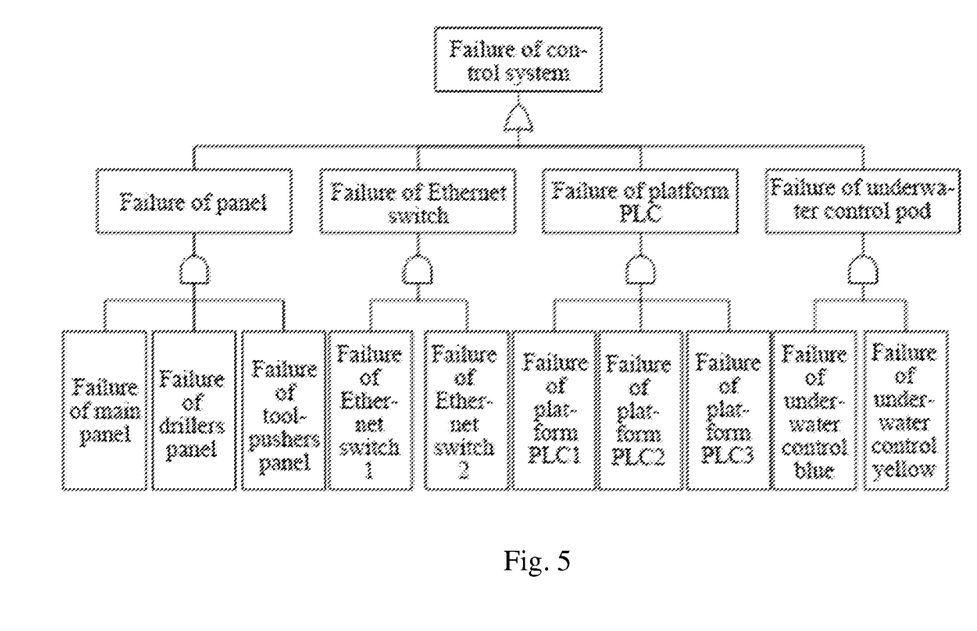
FIG. 5 is a schematic diagram showing a simplified fault tree model of the control system of an offshore oil well control equipment.
Figure 6:
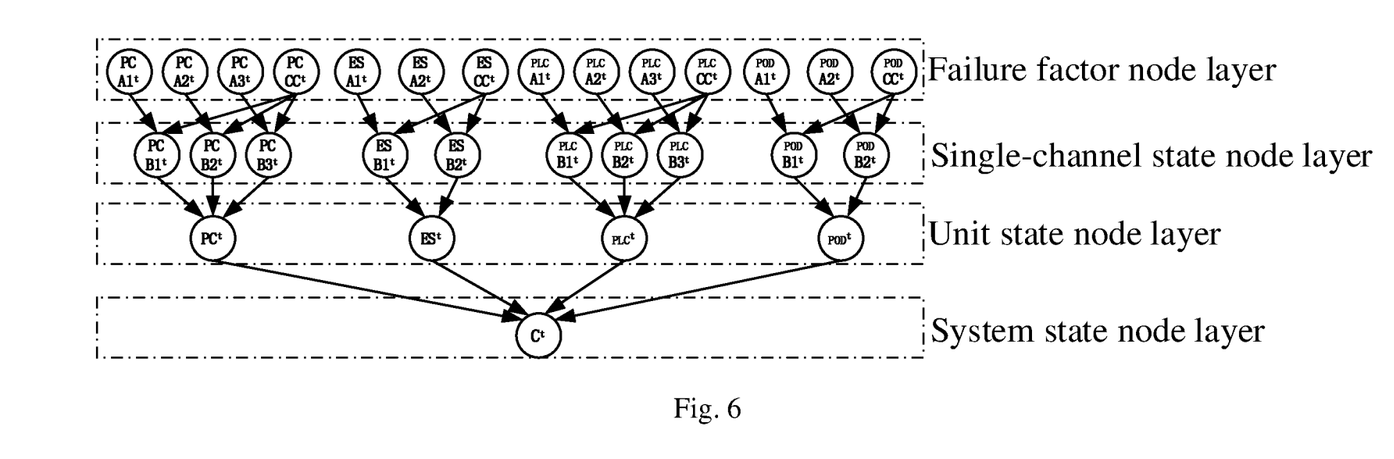
FIG. 6 shows a static Bayesian network model of a control system of the offshore oil well control equipment.

As shown in FIG. 1b, the establishing a Bayesian network model for calculation specially comprises:

S201: establishing a dynamic Bayesian network model for the configuration characteristics of the controller subsystem of the offshore oil well control equipment. The structure of the dynamic Bayesian network model for the controller subsystem of the offshore oil well control equipment is shown in FIG. 4, the dynamic Bayesian network for the controller subsystem consists of N static Bayesian network models of the same structure; the number N of the static Bayesian networks is calculated by the following formula:

$$N=TS/\Delta t$$

wherein TS is the running time of the system, and $\Delta t$ is a self-inspection time interval; and the system performs the self-inspection each time after one $\Delta t$ is elapsed. The inspection test is performed on system, and the detected failure is repaired after the inspection test interval TI is elapsed; and the process of establishing the controller subsystem dynamic Bayesian network is as follows:

(1) determining the static Bayesian network model structure of the controller subsystem according to the structural configuration characteristics of the controller subsystem and the fault tree model of the controller subsystem; wherein the simplified fault tree model of the control system of the offshore oil well control equipment is shown in FIG. 5, the static Bayesian network model of the control system of the offshore oil well control equipment corresponding to the simplified fault tree model of the control system of the offshore oil well control equipment is shown in FIG. 6, and the static Bayesian network model of the controller subsystem has four layers of nodes in total; the first layer is a failure factor node layer, the type of nodes includes single-channel independent failure node and common cause failure node, each of which has five states including normal state NS, detected safe failure state SD, undetected safe failure state SU, detected dangerous failure state DD and undetected dangerous failure state DU, respectively; the second layer is a single-channel state node layer, the node represents the state of each channel in unit, and each node has five states including normal state NS, detected safe failure state SD, undetected safe failure state SU, detected dangerous failure state DD and undetected dangerous failure state DU, respectively; the third layer is a unit state node layer, the node represents the state of each unit, and each node has four states including normal state NS, safe failure state SF, detected dangerous failure state DD and undetected dangerous failure state DU, and the unit has a safe failure when the unit is in the safe failure state SF; and the fourth layer is a system state node layer, and the node represents the state of the controller subsystem and has three states including normal state NS, safe failure state SF and dangerous failure state DF, respectively;

(2) determining the conditional probability tables within a single static Bayesian network; wherein the probability at which respective nodes of the failure factor node layer within a first static Bayesian network is in the normal state NS is 100%; the conditional probability table of the second layer nodes is determined according to the effect of failure factors on the single-channel state, the conditional probability table of the second layer nodes is shown in Table 1, in which w is the common cause weighting; the conditional probability table of the third layer nodes is determined according to the failure criterion of a redundant structure; and the conditional probability table of the fourth layer nodes is determined according to the syntagmatic relations among various units and the fault tree model;

TABLE 1

Conditional probability table of B nodes of the redundant structure

| States of failure factor nodes | | States of node B | | | | |
|---|---|---|---|---|---|---|
| Node A | Node CC | NS | SD | SU | DD | DU |
| NS | NS | 1 | 0 | 0 | 0 | 0 |
| SD | NS | 0 | 1 | 0 | 0 | 0 |
| SU | NS | 0 | 0 | 1 | 0 | 0 |
| DD | NS | 0 | 0 | 0 | 1 | 0 |
| DU | NS | 0 | 0 | 0 | 0 | 1 |
| NS | SD | 0 | 1 | 0 | 0 | 0 |
| SD | SD | 0 | 1 | 0 | 0 | 0 |
| SU | SD | 0 | w | 1-w | 0 | 0 |
| DD | SD | 0 | w | 0 | 1-w | 0 |
| DU | SD | 0 | w | 0 | 0 | 1-w |
| NS | SU | 0 | 0 | 1 | 0 | 0 |
| SD | SU | 0 | 1-w | w | 0 | 0 |
| SU | SU | 0 | 0 | 1 | 0 | 0 |
| DD | SU | 0 | 0 | w | 1-w | 0 |
| DU | SU | 0 | 0 | w | 0 | 1-w |
| NS | DD | 0 | 0 | 0 | 1 | 0 |
| SD | DD | 0 | 1-w | 0 | w | 0 |
| SU | DD | 0 | 0 | 1-w | w | 0 |
| DD | DD | 0 | 0 | 0 | 1 | 0 |
| DU | DD | 0 | 0 | 0 | w | 1-w |
| NS | DU | 0 | 0 | 0 | 0 | 1 |
| SD | DU | 0 | 1-w | 0 | 0 | w |
| SU | DU | 0 | 0 | 1-w | 0 | w |
| DD | DU | 0 | 0 | 0 | 1-w | w |
| DU | DU | 0 | 0 | 0 | 0 | 1 |

Figure 7:
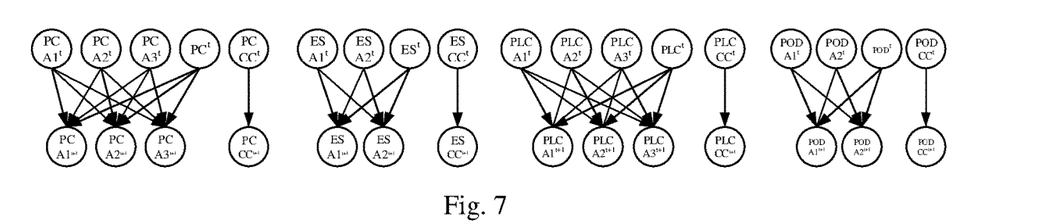
FIG. 7 is a schematic diagram showing state transition of a dynamic Bayesian network of a control system of the offshore oil well control equipment during self-inspection.

(3) determining the transition conditional probability of the dynamic Bayesian network at self-inspection. As shown in FIG. 7, the probability of the single-channel failure factor nodes of a next static Bayesian network is affected by the single-channel failure factor nodes and the unit state nodes of the previous static Bayesian network, and the rules for the transition conditional probability is as follows:

1) the single-channel independent failure node is degraded exponentially to the detected safe failure state SD, the undetected safe failure state SU, the detected dangerous failure state DD and the undetected dangerous failure state DU at $\lambda_{SDN}$, $\lambda_{SUN}$, $\lambda_{DDN}$, and $\lambda_{DUN}$, respectively when the single-channel independent failure node is in the normal state NS; wherein, $\lambda_{SDN}$ is the detected independent safe failure rate, $\lambda_{SUN}$ is the undetected independent safe failure rate, $\lambda_{DDN}$ is the detected independent dangerous failure rate, and $\lambda_{DUN}$ is the undetected independent dangerous failure rate;

2) the single-channel independent failure node is converted into the normal state NS at $\mu_{SR}$ according to the law of exponential distribution if the safe failure of the assessment unit is caused when the single-channel independent failure node is in the detected safe failure state SD or the detected dangerous failure state DD state, otherwise, the single-channel independent failure node is converted to the normal state NS at $\mu_{TR}$ according to the law of exponential distribution;

3) the single-channel independent failure node is converted to the normal state NS at $\mu_{SR}$ according to the law of exponential distribution if the parent node of the single-channel independent failure node causes the safe failure of the assessment unit when the single-channel independent failure node is in the undetected safe failure state SU; the single-channel independent failure node is converted to the normal state NS at $\mu_{TR}$ according to the law of exponential distribution if the parent node of a single-channel independent failure node contains at least one detected failure, otherwise, the single-channel independent failure node maintains the undetected safe failure state SU unchanged;

4) the single-channel independent failure node is converted to the normal state NS at $\mu_{SR}$ according to the law of exponential distribution if the parent node of the single-channel independent failure node causes the safe failure of the assessment unit when the single-channel independent failure node is in the undetected dangerous failure state DU; the single-channel independent failure node is converted to the normal state NS at $\mu_{TR}$ according to the law of exponential distribution if the parent node of a single-channel independent failure node contains at least one detected failure, otherwise, the single-channel independent failure node maintains the undetected dangerous failure state DU unchanged;

the probability of the common cause failure factor nodes of the next static Bayesian network is only affected by the common cause failure factor nodes of the previous static Bayesian network; the probability of the failure factor nodes of the next static Bayesian network is determined according to the degradation law of the device and the self-inspection capability of the system. The transition conditional probability table of the common cause failure node CC is shown in Table 2:

TABLE 2

Transition conditional probability table of CC node

Figure 8:
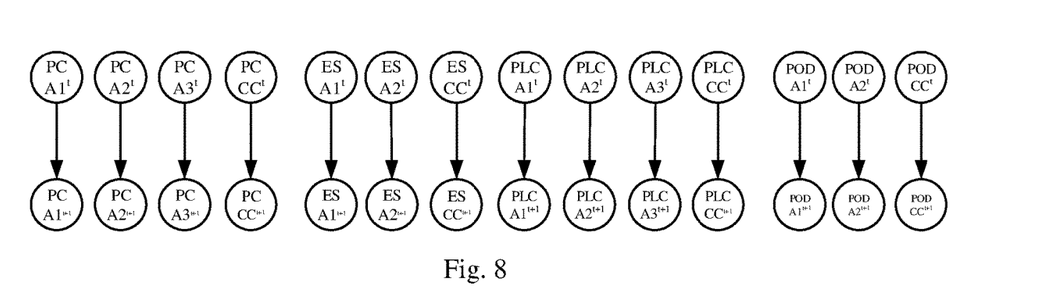
FIG. 8 is a schematic diagram showing state transition of a dynamic Bayesian network of a control system of the offshore oil well control equipment during inspection test.

| Time point t | Time point t + Δt | | | | |
|---|---|---|---|---|---|
| | NS | SD | SU | DD | DU |
| NS | $e^{-\lambda_C \Delta t}$ | $\frac{\lambda_{SDC}}{\lambda_C}(1 - e^{-\lambda_C \Delta t})$ | $\frac{\lambda_{SUC}}{\lambda_C}(1 - e^{-\lambda_C \Delta t})$ | $\frac{\lambda_{DDC}}{\lambda_C}(1 - e^{-\lambda_C \Delta t})$ | $\frac{\lambda_{DUC}}{\lambda_C}(1 - e^{-\lambda_C \Delta t})$ |
| SD | $1 - e^{-\mu_{SR} \Delta t}$ | $e^{-\mu_{SR} \Delta t}$ | 0 | 0 | 0 |
| SU | $1 - e^{-\mu_{SR} \Delta t}$ | 0 | $e^{-\mu_{SR} \Delta t}$ | 0 | 0 |
| DD | $1 - e^{-\mu_{TR} \Delta t}$ | 0 | 0 | $e^{-\mu_{TR} \Delta t}$ | 0 |
| DU | 0 | 0 | 0 | 0 | 1 |

Wherein $\lambda_C = \lambda_{SDC} + \lambda_{SUC} + \lambda_{DDC} + \lambda_{DUC}$, $\lambda_{SDC}$ is the detected common cause safe failure rate, $\lambda_{SUC}$ is the undetected common cause safe failure rate, $\lambda_{DDC}$ is the detected common cause dangerous failure rate, $\lambda_{DUC}$ is the undetected common cause dangerous failure rate; $\mu_{SR}=1/\text{MTSR}$, MTSR is a mean time to system restoration; $\mu_{TR}=1/\text{MTTR}$, MTTR is the mean time to repair;

(4) determining the transition conditional probability table of the dynamic Bayesian network at inspection test. As shown in FIG. 8, the probability of the failure factor nodes of the next static Bayesian network is affected by the failure factor nodes of the previous static Bayesian network; and the probability of the failure factor nodes of the next static Bayesian network is determined according to the inspection coverage rates and repair parameters of device; the conditional state transition probability table of the failure factor nodes at the inspection test period is shown in Table 3 in which the different combinations of values of the inspection test parameter variables $\xi$, $\delta$, $\theta$, $\sigma$, $\alpha$, $\epsilon$, $\mu$, $\gamma$ represent different inspection coverage rates and repair parameters;

TABLE 3

State transition conditional probability table of the failure factor nodes at the inspection test period

| Before inspection | After inspection test | | | | |
|---|---|---|---|---|---|
| test | NS | SD | SU | DD | DU |
| NS | $1-\gamma$ | $\alpha\gamma(1-\sigma)$ | $\alpha\gamma\sigma$ | $(1-\alpha)\gamma(1-\sigma)$ | $(1-\alpha)\gamma\sigma$ |
| SD | $\xi$ | $1-\xi$ | 0 | 0 | 0 |
| SU | $\delta$ | $(1-\delta)(1-\epsilon)$ | $(1-\delta)\epsilon$ | 0 | 0 |
| DD | $\mu$ | 0 | 0 | $1-\mu$ | 0 |
| DU | $\theta$ | 0 | 0 | $(1-\theta)(1-\epsilon)$ | $(1-\theta)\epsilon$ |

S202: determining failure probability parameters of each unit device in the controller subsystem; wherein the failure probability parameters are divided into a direct form and an indirect form. The failure probability parameters in the direct form include detected independent safe failure rate $\lambda_{SDN}$, undetected independent safe failure rate $\lambda_{SUN}$, detected independent dangerous failure rate $\lambda_{DDN}$, undetected independent dangerous failure rate $\lambda_{DUN}$, detected common cause safe failure rate $\lambda_{SDC}$, undetected common cause safe failure rate $\lambda_{SUC}$, detected common cause dangerous failure rate $\lambda_{DDC}$, undetected common cause dangerous failure rate $\lambda_{DUC}$; and the failure probability parameters in the indirect form include failure rate $\lambda_T$, safe failure ratio $R_S$, safe failure diagnosis coverage rate $C_S$, dangerous failure diagnosis coverage rate $C_D$, undetected common cause failure rate $\beta$ and detected common cause failure rate $\beta_D$ of respective channels in units;

S203: determining time parameters of the controller subsystem device; wherein the time parameters includes mean time to repair MTTR, mean time to system restoration MTSR, inspection test interval period TI, running time of a system TS, self-inspection time interval $\Delta t$;

S204: determining the structurally constraint type of the controller subsystem; wherein the structurally constraint type is divided into A type and B type, the A type subsystem includes instrument device with a simple structure such as switch, valve and relay, and the B type subsystem includes device with a complicated structure such as microprocessor and intelligent transducer;

S205: determining inspection test parameters of devices in the controller subsystem;

S206: performing accurate calculation by the established dynamic Bayesian network model to obtain safety integrity parameters of the controller subsystem; wherein the safety integrity parameters include a safe failure fraction SFF of the controller subsystem, an allowable maximum safety integrity level of the controller subsystem, the safety integrity level SIL of the controller subsystem, the probability of dangerous failure on demand PFD at respective time points in the controller subsystem operation, the probability of safe failure on demand PFS at respective time points in the system operation, and the average probability of dangerous failure on system demand PFDavg and the average probability of safe failure on system demand PFSavg are obtained by the following formula:

$$PFD_{avg} = \frac{\sum_{t=1}^{N} PFD(t)}{N}$$

$$PFS_{avg} = \frac{\sum_{t=1}^{N} PFS(t)}{N}$$

S207: determining the safety integrity level ultimately by the average probability of dangerous failure on system demand PFDavg; wherein the four data of PFD, PFS, PFDavg and PFSavg calculated by the established dynamic Bayesian network model are four 1*N matrices, and the change process of safety integrity parameters of the controller subsystem can be shown through the image;

S208: optimizing the parameters affecting the safety integrity level by analyzing the safety integrity parameters of the controller subsystem; and S209: repeating steps of S201 to S208 to assess the sensor subsystem and the actuator subsystem, respectively.

The performing integrated calculation and optimization analysis specifically includes:

S301: integrating safety integrity parameters of the controller subsystem, the sensor subsystem, and the actuator subsystem to obtain the safety integrity parameters of a safety instrumented functions; wherein the average probability of dangerous failure on demand $PFD_{SYS}$ of the safety instrumented functions is calculated as follows:

$$PFD_{SYS} = PFD_S + PFD_L + PFD_{FE}$$

wherein $PFD_S$ is the average probability of dangerous failure on demand of the sensor subsystem, $PFD_L$ is the average probability of dangerous failure on demand of the controller subsystem and $PFD_{FE}$ is the average probability of dangerous failure on demand of the actuator subsystem;

S302: obtaining the weak link of the subsystems by analyzing the safety integrity parameters and the ratio of parameters of the controller subsystem, the sensor subsystem, and the actuator subsystem, and replacing device, optimizing device configuration, adjusting device inspection time, adjusting device repair parameters for the subsystem with high safety integrity requirements; and S303: generating a safety integrity assessment report.

The invention claimed is:

1. A method for assessing the safety integrity level of an offshore oil well control equipment, comprising three major steps: creating a safety instrument function evaluation module and dividing system devices into subsystems, establishing a Bayesian network model for calculation, and performing integrated calculation and optimization analysis;

the creating the safety instrument function evaluation module and dividing the system devices into subsystems specifically comprises:
S101: according to assessment requirements, creating the safety instrumented function module;
S102: dividing a plurality of the system devices into a sensor subsystem, a controller subsystem, and an actuator subsystem; wherein the division of the sensor subsystem, the controller subsystem, and the actuator subsystem is as follows:

(1) the sensor subsystem includes at least one device capable of detecting and predicting blowout parameters and kick parameters, and at least one device for transmitting detected information;
(2) the controller subsystem consists of a ground control part, an underwater control module and an operator as the operating subject, wherein the ground control part consists of a main panel, a drillers panel, a toolpushers panel, and a hydraulic power system; the underwater control module consists of a blue pod underwater control module, a yellow pod underwater control module, an underwater accumulator bottle group, and an emergency battery DC power supply; and
(3) the actuator subsystem includes underwater solenoid valves, hydraulic control valves, and hydraulic valves;

the establishing a Bayesian network model for calculation specially comprises:

S201: establishing a dynamic Bayesian network model for configuration characteristics of the controller subsystem of the offshore oil well control equipment; wherein the dynamic Bayesian network for the controller subsystem consists of N static Bayesian network models of the same structure; the number N of the static Bayesian networks is calculated by the following formula:

$$N=TS/\Delta t$$

wherein TS is the running time of system, and $\Delta t$ is a self-inspection time interval; and the system performs the self-inspection each time after one self-inspection time interval $\Delta t$ is elapsed, the inspection test is performed on the system, and the detected failure is repaired after the inspection test interval (TI) is elapsed; and the process of establishing the dynamic Bayesian network for the controller subsystem is as follows:

(1) determining the static Bayesian network model structure of the controller subsystem according to structural configuration characteristics of the controller subsystem and a fault tree model of the controller subsystem; wherein the static Bayesian network model of the controller subsystem has four layers of nodes in total; the first layer is a failure factor node layer, the type of nodes includes single-channel independent failure nodes and common cause failure nodes each of which has five states including normal state (NS), detected safe failure state (SD), undetected safe failure state (SU), detected dangerous failure state (DD) and undetected dangerous failure state (DU), respectively; the second layer is a single-channel state node layer, the node represents the state of each channel in unit, and each node has five states including normal state (NS), detected safe failure state (SD), undetected safe failure state (SU), detected dangerous failure state (DD) and undetected dangerous failure state (DU), respectively; the third layer is a unit state node layer, the node represents the state of each unit, and each node has four states including normal state (NS), safe failure state (SF), detected dangerous failure state (DD) and undetected dangerous failure state (DU), and the unit has a safe failure when the unit is in the safe failure state (SF); and the fourth layer is a system state node layer, and the node represents the state of the controller subsystem and has three states including normal state (NS), safe failure state (SF) and dangerous failure state (DF), respectively;
(2) determining a plurality of conditional probability tables within a single static Bayesian network; wherein the probability at which respective nodes of the failure factor node layer within a first static Bayesian network is in the normal state (NS) is 100%; the conditional probability table of the second layer nodes is determined according to the effect of failure factors on the single-channel state; the conditional probability table of the third layer nodes is determined according to the failure criterion of a redundant structure; and the conditional probability table of the fourth layer nodes is determined according to the syntagmatic relations among various units and the fault tree model;
(3) determining at least one transition conditional probability of the dynamic Bayesian network at self-inspection; wherein the probability of the single-channel failure factor nodes of a next static Bayesian network is affected by the single-channel failure factor nodes and the unit state nodes of the previous static Bayesian network, and the probability of the common cause failure factor nodes of the next static Bayesian network is only affected by the common cause failure factor nodes of the previous static Bayesian network; and the probability of the failure factor nodes of the next static Bayesian network is determined according to the device degradation law and the self-inspection capability of the system;
(4) determining at least one transition conditional probability of the dynamic Bayesian network at inspection test; wherein the probability of the failure factor nodes of the next static Bayesian network is affected by the failure factor nodes of the previous static Bayesian network; and the probability of the failure factor nodes of the next static Bayesian network is determined according to the inspection coverage rate and repair parameters of device;

S202: determining failure probability parameters of each unit device in the controller subsystem;

S203: determining time parameters of the controller subsystem device; wherein the time parameters includes mean time to repair (MTTR), mean time to system restoration (MTSR), inspection test interval period (TI), running time of a system (TS), and self-inspection time interval;

S204: determining a structurally constraint type of the controller subsystem; wherein the structurally constraint type is divided into A type and B type, the A type subsystem includes instrument device with a simple structure such as switch, valve and relay, and the B type subsystem includes device with a complicated structure such as microprocessor and intelligent transducer;

S205: determining inspection test parameters of devices in the controller subsystem;

S206: performing a calculation by the established dynamic Bayesian network model to obtain safety integrity parameters of the controller subsystem; wherein the safety integrity parameters include a safe failure fraction (SFF) of the controller subsystem, an allowable maximum safety integrity level of the controller subsystem, the safety integrity level (SIL) of the controller subsystem, the probability of dangerous failure on demand (PFD) at respective time points in the controller subsystem operation, the probability of safe failure on demand (PFS) at respective time points in the system operation, and the average probability of dangerous failure on system demand PFDavg and the average probability of safe failure on system demand PFSavg are obtained by the following formula:

$$PFD_{avg} = \frac{\sum_{t=1}^{N} PFD(t)}{N}$$

$$PFS_{avg} = \frac{\sum_{t=1}^{N} PFS(t)}{N}$$

S207: determining the safety integrity level ultimately by the average probability of dangerous failure on system demand PFDavg; wherein the four data of PFD, PFS, PFDavg and PFSavg calculated by the established dynamic Bayesian network model are four 1*N matrices, and the change process of the safety integrity parameters of the controller subsystem can be shown through image;

S208: optimizing parameters affecting the safety integrity level by analyzing the safety integrity parameters of the controller subsystem; and S209: repeating steps of S201 to S208 to assess the sensor subsystem and the actuator subsystem, respectively;

the performing integrated calculation and optimization analysis specifically includes:

S301: integrating safety integrity parameters of the controller subsystem, the sensor subsystem, and the actuator subsystem to obtain the safety integrity parameters of one or more safety instrumented functions; wherein the average probability of dangerous failure on demand $PFD_{Sys}$ of the safety instrumented functions is calculated as follows:

$$PFD_{Sys} = PFD_S + PFD_L + PFD_{FE}$$

wherein $PFD_S$ is the average probability of dangerous failure on demand of the sensor subsystem, $PFD_L$ is the average probability of dangerous failure on demand of the controller subsystem, and $PFD_{FE}$ is the average probability of dangerous failure on demand of the actuator subsystem;

S302: obtaining weak link of subsystems by analyzing the safety integrity parameters and ratio of parameters of the controller subsystem, the sensor subsystem, and the actuator subsystem, and replacing device, optimizing device configuration, adjusting device inspection time, adjusting device repair parameters for the subsystem with high safety integrity requirements; and S303: generating a safety integrity assessment report.

2. The method for assessing the safety integrity level of the offshore oil well control equipment of claim 1, wherein according to the assessment requirements, the safety instrumented function module is created; according to the configuration of the offshore oil well control equipment, the initially set safety instrumented functions include opening function of an upper annular blowout preventer, closing function of the upper annular blowout preventer, opening function of a lower annular blowout preventer, closing function of the lower annular blowout preventer, opening function of a drill pipe shear seal ram blowout preventer, closing function of the drill pipe shear seal ram blowout preventer, opening function of a casing shear ram blowout preventer, closing function of the casing shear ram blowout preventer, opening function of an upper ram blowout preventer, closing function of the upper ram blowout preventer, opening function of an intermediate ram blowout preventer, closing function of the intermediate ram blowout preventer, opening function of a lower ram blowout preventer, closing function of the lower ram blowout preventer, opening function of a test ram blowout preventer, and closing function of the test ram blowout preventer.

3. The method for assessing the safety integrity level of the offshore oil well control equipment of claim 1, wherein failure probability parameters of each unit device in the controller subsystem are determined; the failure probability parameters are divided into a direct form and an indirect form; the failure probability parameters in the direct form include detected independent safe failure rate $\lambda_{SDN}$, undetected independent safe failure rate $\lambda_{SUN}$, detected independent dangerous failure rate $\lambda_{DDN}$, undetected independent dangerous failure rate $\lambda_{DUN}$, detected common cause safe failure rate $\lambda_{SDC}$, undetected common cause safe failure rate $\lambda_{SUC}$, detected common cause dangerous failure rate $\lambda_{SDC}$, undetected common cause dangerous failure rate $\lambda_{DUC}$; and the failure probability parameters in the indirect form include failure rate $\lambda_T$, safe failure ratio $R_S$, safe failure diagnosis coverage rate $C_S$, dangerous failure diagnosis coverage rate $C_D$, undetected common cause failure rate $\beta$ and detected common cause failure rate $\beta_D$ of respective channels in units.

\* \* \* \* \*